United States Patent
Kuwabara et al.

(10) Patent No.: US 9,243,665 B2
(45) Date of Patent: Jan. 26, 2016

(54) LINEAR MOTION GUIDE UNIT WITH LUBRICATING MEMBER

(71) Applicant: NIPPON THOMPSON CO., LTD., Tokyo (JP)

(72) Inventors: Hideki Kuwabara, Gifu-ken (JP); Go Kamon, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/479,576

(22) Filed: Sep. 8, 2014

(65) Prior Publication Data

US 2015/0086140 A1   Mar. 26, 2015

(30) Foreign Application Priority Data

Sep. 25, 2013   (JP) .................................. 2013-198404

(51) Int. Cl.
*F16C 33/66*   (2006.01)
*F16C 29/06*   (2006.01)

(52) U.S. Cl.
CPC ........... *F16C 33/6648* (2013.01); *F16C 29/065* (2013.01); *F16C 29/0609* (2013.01); *F16C 33/6655* (2013.01)

(58) Field of Classification Search
CPC ............. F16C 29/0602; F16C 29/0611; F16C 29/0652–29/0666; F16C 33/66; F16C 33/6611; F16C 33/6648; F16C 33/6655; F16C 29/0609; F16C 29/065
See application file for complete search history.

(56) References Cited

U.S. PATENT DOCUMENTS

| | | | | |
|---|---|---|---|---|
| 5,399,023 A * | 3/1995 | Winkelmann et al. | ........... | 384/13 |
| 6,024,490 A * | 2/2000 | Shirai | ............... | 384/13 |
| 6,123,457 A * | 9/2000 | Suzuki et al. | ................... | 384/13 |
| 7,534,042 B2 * | 5/2009 | Kuwabara | ........................ | 384/13 |
| 7,780,356 B2 * | 8/2010 | Kuwabara et al. | ............... | 384/13 |
| 7,862,234 B2 * | 1/2011 | Kuwabara et al. | ............... | 384/44 |
| 7,927,016 B2 * | 4/2011 | Kuwabara | ........................ | 384/13 |
| 8,403,562 B2 * | 3/2013 | Geka et al. | ...................... | 384/15 |
| 8,641,280 B2 * | 2/2014 | Shibuya et al. | ................... | 384/13 |
| 8,858,080 B2 * | 10/2014 | Kikuchi | ........................... | 384/13 |
| 2006/0102427 A1 * | 5/2006 | Wu et al. | ............................ | 184/5 |
| 2007/0053619 A1 * | 3/2007 | Kuwabara | ........................ | 384/13 |
| 2015/0071576 A1 * | 3/2015 | Kito | ............................... | 384/13 |

FOREIGN PATENT DOCUMENTS

| | | |
|---|---|---|
| JP | 10205534 A | 8/1998 |
| JP | 2007100951 A | 4/2007 |
| JP | 2009144746 A | 7/2009 |
| JP | 2012154438 A | 8/2012 |

* cited by examiner

*Primary Examiner* — Alan B Waits
(74) *Attorney, Agent, or Firm* — Browdy and Neimark, PLLC

(57) ABSTRACT

A linear motion guide unit makes application of lubricant around rolling elements at the turnaround passage to accomplish securely the maintenance-free lubrication over a prolonged period of time. A lubricant reservoir plate of porous compact is composed of a lubricant reservoir major body impregnated with lubricant and an applicator nose which is different in the molded density from the lubricant reservoir major body. The lubricant reservoir plate impregnated with lubricant is composed of the lubricant reservoir major body installed in a recess made in the end cap and the applicator nose extends through a slot of the turnaround passage to expose itself to the turnaround passage to make application of lubricant around the rolling elements.

7 Claims, 10 Drawing Sheets

LINEAR MOTION GUIDE UNIT WITH LUBRICATING MEMBER

FIELD OF THE INVENTION

The present invention relates to a linear motion guide unit composed of an elongated guide rail and a slider designed to move on the elongated guide rail relative to the guide rail through more than one rolling element. More especially, the present invention relates to a linear motion guide unit in which the slider has a lubricant reservoir plate of porous compact.

BACKGROUND OF THE INVENTION

Conventionally, the linear motion guide units are composed of an elongated guide rail or guide shaft, and a slider which fits over or conforms to the guide rail or guide shaft for sliding movement relative to the guide rail or guide shaft through more than one rolling element of balls or rollers which are allowed to circulate in an endless manner through an endless circuit made up of a load-carrying race defined between the guide rail and the slider, a return passage extending in the slider and turnaround passages lying at opposite ends of the slider. With the prior linear motion guide units with lubricating members, while lubrication between the race and the rolling elements has been ensured with periodic application or resupply of lubricant, advanced linear motion guide units recently become required to meet needs of maintenance-free operation for lubrication over a prolonged interval of time for cost savings of maintenance for lubrication in the machinery and/or installation.

In Japanese Laid-Open Patent Application No. 2007-100 951 which is a commonly-assigned senior application, there is disclosed a linear motion guide unit having lubricant resupply means in which application of lubricant around the rolling elements is done at the turnaround passage to make the lubrication system simpler than ever in construction, along with maintenance-free for steady and positive lubrication. With the prior linear motion guide unit constructed as stated earlier, the end cap has an opening extending from a recess on the outward end surface to the turnaround passage and a lubricant reservoir plate of porous compact impregnated with lubricant fits into the recess on the outward end surface of the end cap. The lubricant reservoir plate has an applicator nose extending through the opening in the end cap to form at the extremity thereof in part the circular wall of the turnaround passage to expose itself to come into engagement with the rollers rolling through the turnaround passage to feed the rolling elements with lubricant through the applicator noses of the lubricant reservoir plate, thereby making application of lubricant around the rollers while rolling through the turnaround passage.

We has developed a linear motion guide unit with a lubricating plate which can be easily attached and/or removed without making an alternation in basic specifications disclosed in Japanese Laid-Open Patent Application No. H 10-205 534 which is also a commonly-assigned senior application. With the linear motion guide unit recited earlier, the lubricating plate is disposed between a spacer and an end seal and attached to a carriage of a slider to travel relative to a guide rail in a way making sliding contact with raceway grooves on the guide rail. The lubricating plate is made of sintered resinous material of porous compact impregnated with oily lubricant. The sintered resinous material is produced after finely powdery synthetic resin has been compacted in a mold under pressure together with the application of heat. The lubricating plate is divided into a denser part and a coarse part which are bound together with a covering.

In another Japanese Laid-Open Patent Application No. 2012-154 438 which is a commonly-assigned senior application, there is disclosed a linear motion guide unit in which lubrication for the rolling elements is carried out in a turnaround passage in an end cap and an applicator nose to come into contact with the rolling elements has a molded density greater than in a lubricant reservoir plate to ensure a longer lubrication-life for proper and steady lubrication, with accompanying sustainable maintenance-free condition for lubrication. The lubricant reservoir plate of porous compact impregnated with lubricant fits in a recess on the end cap to expose the applicator nose integral with the lubricant reservoir plate to the turnaround passage through an opening cut in the turnaround passage to make application of lubricant around the rolling elements by use of the applicator nose. With the lubricant reservoir plate, the applicator nose of the porous compact has the molded density of from 0.60 g/cm$^3$ to 0.70 g/cm$^3$, and the lubricant reservoir plate of the porous compact has the molded density of from 0.40 g/cm$^3$ to 0.60 g/cm$^3$.

With the prior linear motion guide unit constructed as stated earlier, application of lubricant around the rolling elements is carried out in the turnaround passage in the end cap. More especially, the rolling elements while rolling through the turnaround passage in the end cap come into engagement or contact with the applicator nose of the lubricant reservoir plate and in doing so the lubricant is fed around the rolling elements by means of applicator nose of the lubricant reservoir plate. With the linear motion guide unit constructed as stated earlier, more lubricant than a required and sufficient amount for rolling contact of the rolling elements and the races continues to be applied around the rolling elements in the beginning phase of operation. However, after lubricant contained in the lubricant reservoir plate has diminished down to a preselected level, the lubricant continues reducing with a substantially fixed reduction rate per unit distance. This means that lubricant contained in the lubricant reservoir plate, because more consumed at the beginning phase of operation, gets less as compared with an ideal phase where lubricant would continue to decrease from the beginning with the fixed reduction rate per unit. As a result, the maintenance-free interval is reduced.

Advanced linear motion guide units recently have become required to provide maintenance-free operation for lubrication over a prolonged interval of time for reduction in number of maintenance-free steps and reduction in consumed amount of lubricant aiming at saving of resources and environmental impacts. With the linear motion guide units in which the application of lubricant around rolling elements is carried out in the turnaround passage, accordingly, there has been required development of the maintenance-free construction in which the lubricating member is allowed to store lubricant as much as possible as well as lubricant rids itself of more application at the beginning phase of operation to make sure of smooth application of adequate amount of lubricant around the rolling elements application over a prolong period of time.

SUMMARY OF THE INVENTION

The present invention has for its primary object to overcome the major challenges as stated earlier, and to provide a linear motion guide unit in which application of lubricant to the rolling elements is carried out in the turnaround passage in the end cap while the rolling elements roll through the turnaround passage. To this end, a lubricating member of porous compact installed in the end cap is composed of a lubricant reservoir plate and an applicator nose. The end cap has a through-hole opening to the turnaround passage and the applicator nose extends into the through-hole so as not to protrude into the turnaround passage. Thus, the applicator nose comes into engagement at the edge thereof with the rolling elements while rolling through the turnaround passage without being caught by the applicator nose. As the result, the lubricating member constructed as stated earlier helps realize the maintenance-free operation for application of lubricant around the rolling elements as well as prolong the lubrication life.

The present invention is concerned with a linear motion guide unit comprising an elongated guide rail having widthwise opposed sides, each of which has first raceway surfaces extending lengthwise of the guide rail, a slider having second raceway surfaces extending in opposition to the first raceway surfaces on the guide rail to define load-carrying races between the first raceway surfaces and the second raceway surfaces, and more than one rolling element rolling through the load-carrying race to move the slider relative to the guide rail;

wherein the slider includes a carriage, end caps, lubricant reservoir plates of porous compact, and end seals, the carriage having the second raceway surfaces and a return passage extending in parallel with the second raceway surfaces, the end caps being fastened on forward and aft end surfaces of the carriage, one to each end surface, and provided with turnaround passages to join together the load-carrying races and the return passages, the lubricant reservoir plates being impregnated with lubricant and installed in the end caps to come into engagement with the rolling elements to make application of the lubricant around the rolling elements while rolling through the turnaround passage, and the end seals being installed on the end caps;

wherein each of the lubricant reservoir plates is composed of a lubricant reservoir main body installed between each of the end caps and each of the end seals to fit in a recess formed in each end cap, and an applicator nose which fits in an opening made in the lubricant reservoir main body and extends into a through-hole to communicate with slots in the respective turnaround passages;

wherein the applicator nose is constituted with a basal part and a nose part raised above the basal part to form annular area lying around the nose part, the annular area being larger in transverse section than the through-hole to come into abutment around the nose part against the end cap to keep the applicator nose in place, and the nose part being integral with the basal part to fit into the opening in the lubricant reservoir main body to expose an end face of the nose part to the turnaround passage; and wherein a molded density of the porous compact is less in the lubricant reservoir main body than in the applicator nose whereby as the lubricant soaked in the applicator nose is consumed, the lubricant previously held in the lubricant reservoir main body moves to be resupplied into the applicator nose by capillary action.

The porous compact to provide the lubricant reservoir plate is made of finely powdery ultrahigh molecular weight synthetic resin, which is first subjected to compacting and the resulting compact is subsequently sintered at an elevated temperature to provide open-porous or open-cellular texture whose pores or cells preserved among fine particles are open each other through interstices or channels. The lubricant reservoir main body has a molded density less than 0.60 g/cm$^3$ and the applicator nose has a molded density in the range of from 0.60 g/cm$^3$ to 0.70 g/cm$^3$. Moreover, the porous compact is made of polyester polyurethane foam of three-dimensional skeleton texture which is molded while compressed to ¼~1/20 under compression to provide open-porous or open-cellular texture. As an alternative, the porous compact is made of fibrous material including nonwoven cloth, felt and cotton.

The nose part of the applicator nose is raised above the basal part to form an annular area around the nose part. The annular area after the lubricant reservoir plate has fit into the recess in the end cap comes into abutment around the nose part against a wall surface around the recess in the end cap to prevent the nose part from protruding into the turnaround passage. As an alternative, the nose part of the applicator nose is raised above the basal part to form an annular area around the nose part, and the annular area after the lubricant reservoir plate has fit into the recess in the end cap comes into abutment around the nose part against a stepwise wall in the opening in the turnaround passage to prevent the nose part from protruding into the turnaround passage.

With the linear motion guide unit constructed as stated earlier, the slot open to the outside circular surface of the turnaround passage in the end cap has an figure elongated in a moving direction of the rollers. Moreover, the nose part of the applicator nose has a solid shape extending from the circular area to a tip face to fit into the slot.

ADVANTAGEOUS EFFECTS OF THE INVENTION

With the linear motion guide unit of the present invention, the lubricant reservoir plate is composed of the lubricant reservoir main body and the applicator nose. The applicator nose is constituted with the basal part which fits into the opening in the lubricant reservoir main body, and the nose part which at the end face thereof comes into contact with the rolling elements while they roll through the turnaround passage. The basal part is made larger in transverse section than the slot to form the circular area lying around the nose part to come into abutment around the nose part against the wall surface of the recess in the end cap major body to keep the applicator nose in place, thereby to restrain the nose part from protrusion into the turnaround passage. Thus, the end face of the nose part comes into engagement with the rolling elements to make the application of lubricant around the rolling elements without causing any obstacle to the movement of the rolling elements, thereby making sure of smooth movement of the rolling elements in the turnaround passage. Moreover, the molded density of the porous compact is made less in the lubricant reservoir main body than in the applicator nose to increase the amount of lubricant impregnated in the lubricant reservoir main body. As the lubricant soaked in the applicator nose is consumed, the lubricant previously preserved in the lubricant reservoir main body is allowed to move to be resupplied into the applicator nose by capillary action. With the lubricant reservoir plate according to the present invention, the lubricant reservoir main body and the applicator nose are constituted separately from each other to have the molded density different from one another, which could help them manufacture with a desired molded density and inspect with ease. The lubricant reservoir plate may be assembled by only insertion of the applicator nose into the opening of the lubricant reservoir main body. With the lubricant reservoir plate, in addition, the lubricant reservoir main body, because it is made of inexpensive material, may be manufactured with a smaller amount of costly material of high molded density. With the lubricant reservoir plate constructed according to the present invention, the uniform amount of lubricant may be supplied around the rolling elements all the time. That is, more application at the beginning phase of operation is controlled to preserve high the remaining rate of lubricant in the lubricant reservoir plate even after prolonged operation of the slider. As a result, the lubrication life of the lubricant reservoir plate is prolonged to realize the maintenance-free operation of the linear motion guide unit.

BRIEF DESCRIPTION OF THE DRAWINGS

FIG. 19 is a view in section showing another version of the lubricant reservoir plate in the linear motion guide unit of the present invention, the view being taken along the plane of line XIX-XIX of FIG. 18, and.

DETAILED DESCRIPTION OF THE PREFERRED EMBODIMENTS

Figure 1:
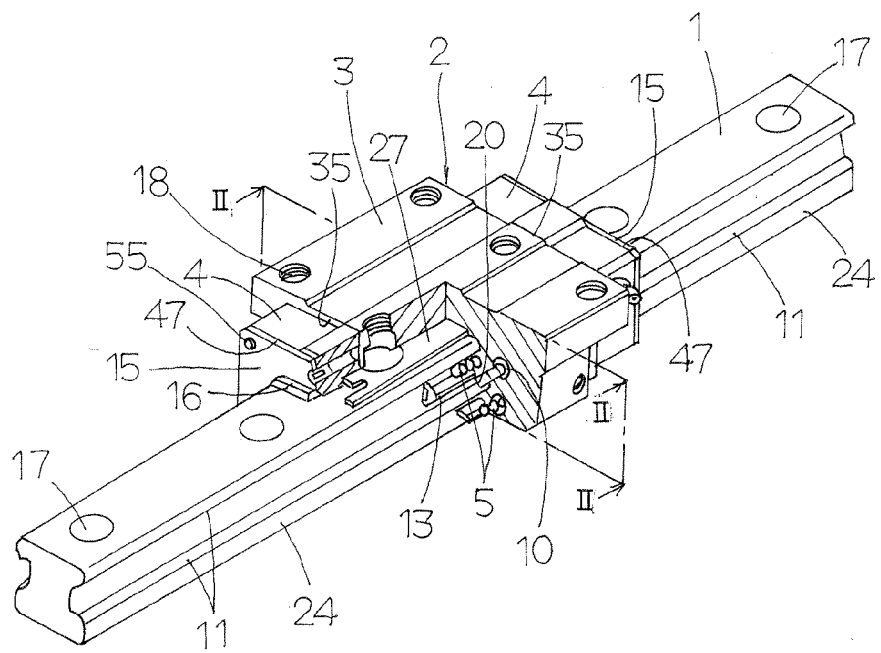
FIG. 1 is a fragmentary and partially cutaway view in perspective showing a preferred embodiment of a linear motion guide unit according to the present invention.

The linear motion guide unit of the present invention is adapted for use in any relatively sliding components in machinery as diverse as various assembling machines, robotic machines, semiconductor fabricating equipment, precision machines, measurement/inspection instruments, medical instruments, micromachines, and so on. The linear motion guide unit of the present invention is especially intended to prolong scheduled intervals of substantial maintenance-free operation for lubrication to conduct better lubrication around the rolling elements to ensure smooth circulation of the rolling elements through the looped or closed circuit.

A preferred embodiment of the linear motion guide unit constructed according to the present invention will be described in detail by reference to the drawings. The linear motion guide unit of the present invention has an elongated guide rail 1 having a pair of raceway surfaces 11 extending on each longitudinal side 24 of the guide rail 1, and a slider 2 which fits over or conforms to the guide rail 1 for movement relative to the guide rail 1 through more than one rolling element or roller 5. The slider 2 is chiefly composed of a carriage 3 having a pair of second raceway surfaces 12 lying in opposition to the first raceway surfaces 11 of the guide rail 1 to define the load-carrying races 20 and return passages 10 lying in parallel with the second raceway surfaces 12 on the carriage 3, end caps 4 each having turnaround passages 30 to connect the respective load-carrying races 20 with the respective return passages 10, and end seals 15 attached on outward end surfaces 35 of the end caps 4, one to each end cap, and provided with lips 16 to close clearances left between the guide rail 1 and the slider 2. More than one roller 5 and separator 19 interposed between adjacent rollers 5 are allowed to roll through circulating circuits 50, each of which is made up of the respective load-carrying races 20, respective turnaround passages 30 and the respective return passages 10. The linear motion guide unit of the present invention is preferably applied to the large unit having the guide rail 1 of, for example 55 mm in width. The slider 2 is made in a flanged type composed of upper middle portion and bulges extending sidewise from the upper middle portion.

Figure 2:
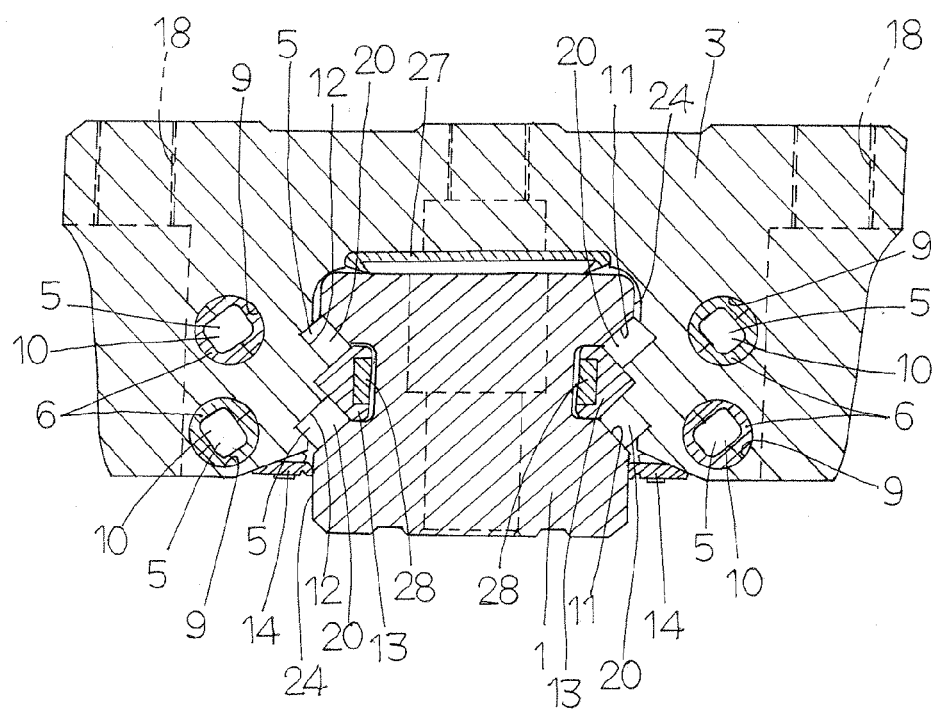
FIG. 2 is a view in transverse section of the linear motion guide unit of FIG. 1, the view being taken on the planes of line II-II of FIG. 1.
Figure 3:
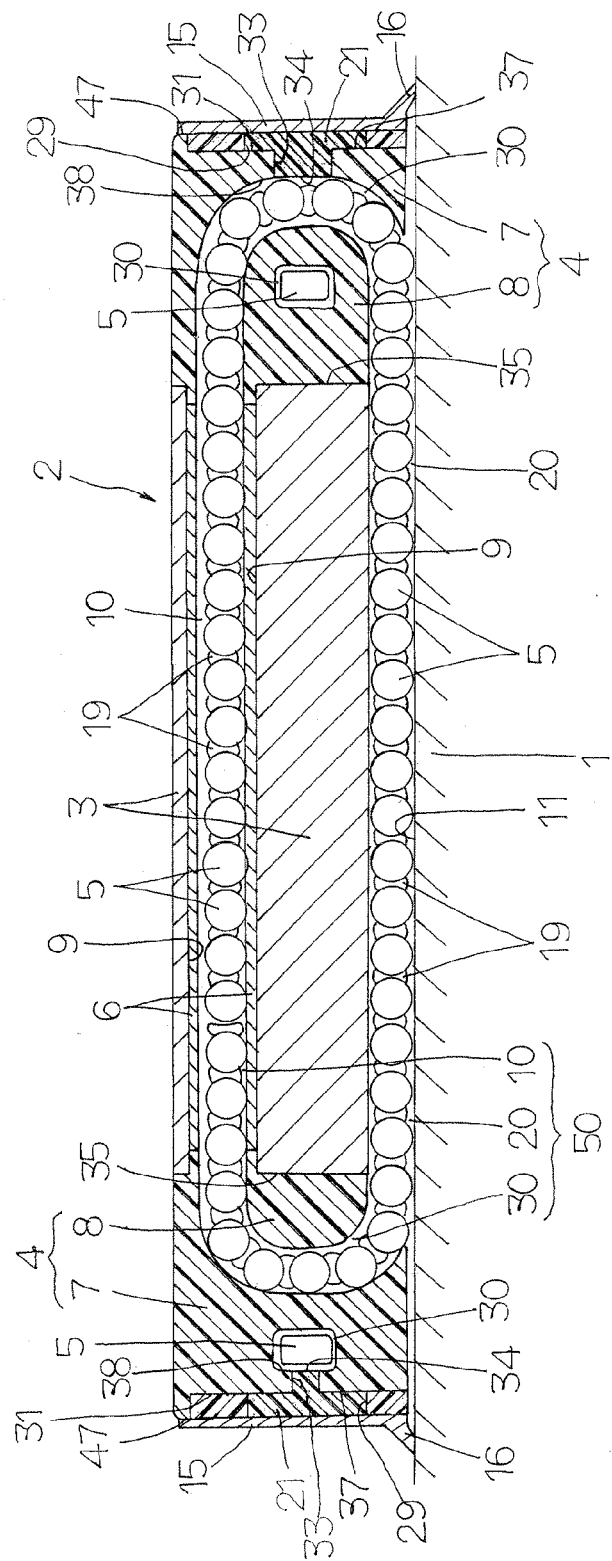
FIG. 3 is a view in longitudinal section showing a circulating circuit made in a slider in the linear motion guide unit of FIG. 1.

With the linear motion guide unit constructed as stated earlier, the rollers 5 running through one of the paired circulating circuits 49, as shown in FIGS. 2 and 3, are allowed to transfer from the downside race 20 carrying downward load because of the slider 2 into the upside return passage 10 in the carriage 3 in a circulating manner. In contrast, the rollers 5 rolling through the other of the paired circulating circuits 49 are allowed to transfer from the upside race 38 carrying upward load because of the slider 2 into the downside return passage 10 in the carriage 3 in a circulating manner. Moreover, as the respective rollers 5 are right circular cylinders, the rollers 5 together with the separators 19 are born on either one of axially opposite ends thereof in sliding-contact relation against a retainer plate 13 extending across the carriage 3 and the end caps 4, while coming into rolling-contact around their circular outside surfaces with the races 20. The retainer plate 13 is attached to the slider 2 by means of a retaining band 28 held to the end caps 4 at lengthwise opposite ends thereof. One of the paired circulating circuits 50, as shown in FIG. 3, is made up of one of the paired load-carrying races 20, the associated return passage 10, and a shorter one of the turnaround passages 30 and a longer one of the turnaround passages 30. In contrast, the other of the paired circulating circuits 50 is constructed as same as the one stated earlier. The paired circulating circuits 50 are intersected with one another in a way staggered from each other in lengthwise direction. The separators 19 as shown in FIG. 3 are each interposed between any two adjacent rollers 5 to keep the rollers against contact or collision with each other. With the linear motion guide unit of the present invention, moreover, an inside seal 27 is placed in the concavity formed in the carriage 3 opposed to the top surface of the guide rail 1. The inside seal 27 is held at the opposite ends thereof which fit into slits 44 made in the end caps 4.

Figure 14:
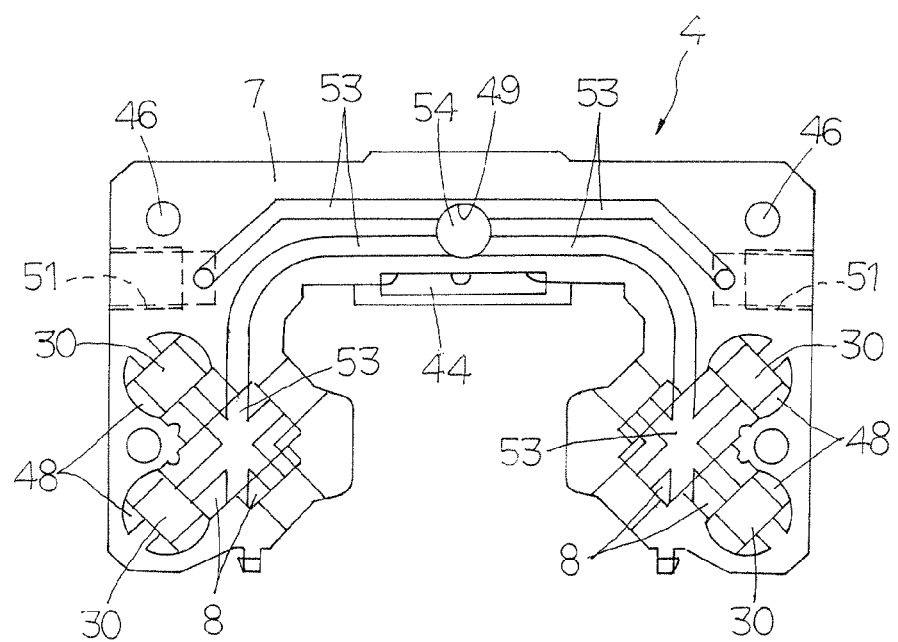
FIG. 14 is a view in front elevation of the end cap of FIG. 13.
Figure 15:
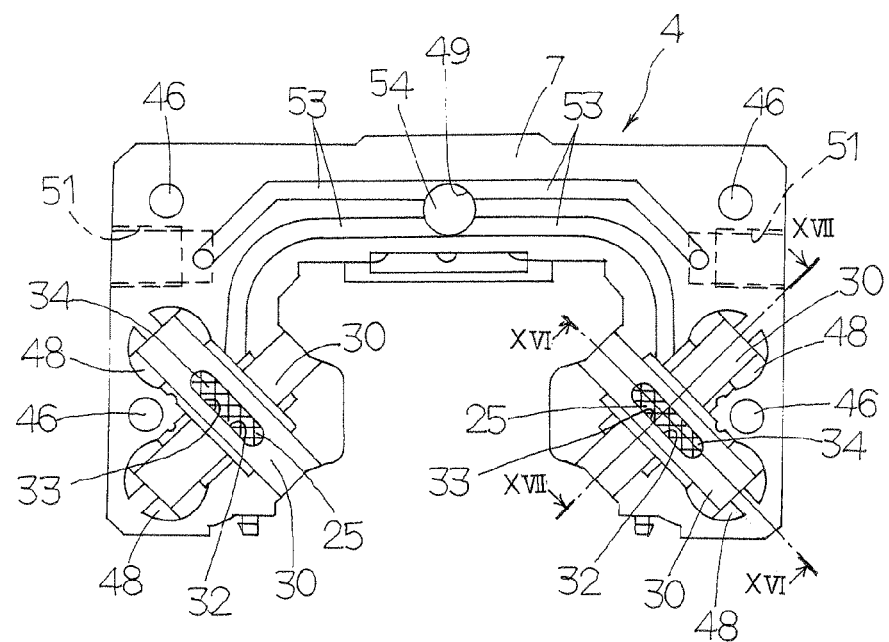
FIG. 15 is a view in rear elevation showing the end cap major body and the lubricant reservoir plate in the linear motion guide unit of the present invention, in which a spacer part is removed from the end cap.
Figure 16:
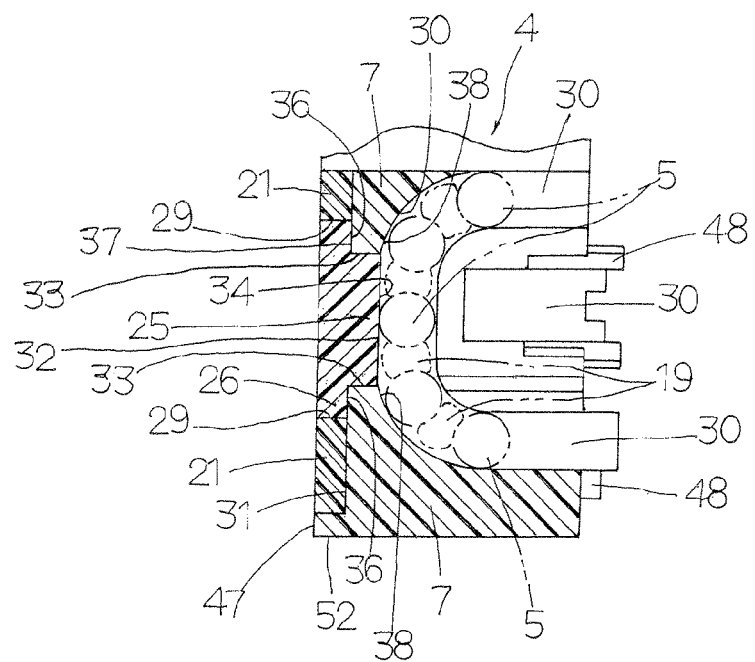
FIG. 16 is a view in section, the view being taken along the plane of line XVI-XVI of FIG. 15.
Figure 17:
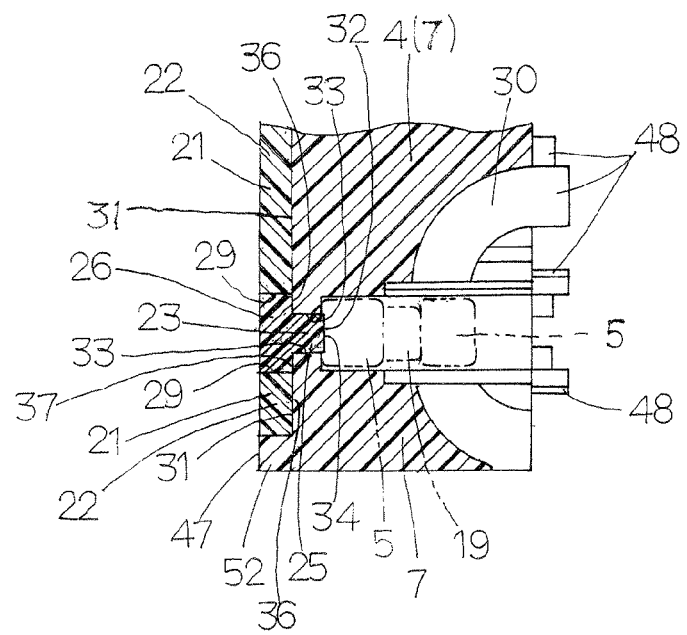
FIG. 17 is a view in section, the view being taken along the plane of line XVII-XVII of FIG. 15.

With the linear motion guide unit constructed as stated earlier, a lower seal 14 is disposed to extend over the underneath of the carriage 3 and the forward and aft end caps 4. The end seal 15 on an end surface 39 thereof makes engagement with an edge 52 around the end cap 4 to cover entirely a lubricant reservoir plate 21. The slider 2 is assembled by the steps of laying the end cap 4, the lubricant reservoir plate 21 and the end seal 15 one after another on the end surface 35 of the carriage 3, then extending fastening bolts 55 through holes 45 in the end seal 15, cuts 42 in the lubricant reservoir plate 21 and holes 46 in the end cap 4, and driving the fastening bolts 55 into threaded holes, not shown, in the carriage 3. A grease nipple, not shown, is driven into a threaded opening 49 in a lubricant resupply port 54 to supply lubricant into the circulating circuits 50 through the threaded hole 49 and the lubricant resupply port 54. More especially, the grease nipple is driven into the threaded hole 49 after it is extended through a bolt hole 51 in the end seal 15 and a U-shaped cut 43 in the lubricant reservoir plate 21. The guide rail 1 is made with some holes 17 that are used to fasten the guide rail 1 to any stationary bed. The carriage 3 of the slider 2 is made therein with some threaded holes 18 that are used to fasten the slider 2 to any component. On the end caps 4, there are provided hooks below the underneath of the end cap 4 to hold in place the lower seal 14, and also bolt holes 46 at four corners of the end caps 4 to allow bolts 55 to fasten the end caps 4 to the carriage 3. The end cap 4, as shown in FIGS. 14 and 15, is made at the middle area thereof with the lubricant resupply port 54 to introduce lubricant from the grease nipple, and further has the oiling grooves 53 to connect the lubricant resupply port 54 to the turnaround passage 30.

The return passage 10 is constituted with a circular hole defined inside a sleeve 6 that fits into a fore-and-aft bore 9 made in the carriage 3 of the slider 2. The sleeve 6 is made of sintered resinous tubular member having cellular or porous structure, whether monolithic or split at 41 into two halves. The sleeve 6, although fitting loosely inside the fore-and-aft bore 9, is held in accurate place by spigots 48 raised above the end caps 4 fastened to lengthwise opposite end surfaces 35 of the carriage 3. The end cap 4 is comprised of a spacer part 8 to define an inside curved half-surface of the turnaround passage 30 and an end cap major body 7 to define an outside curved half-surface 38 of the turnaround passage 30. The end cap major body 7 is recessed below a rear surface of the end cap 4 to accommodate therein an assembly of the spacer part 8 to define the longer turnaround passage 30 and another spacer part 8 nested in the spacer part 8 to define the shorter turnaround passage 30 that gets intersected at right angles with the longer turnaround passage 30 and further staggered from the longer turnaround passage 30 in lengthwise direction of the slider 2. More especially, the turnaround passage 30 in the end cap 4 are entirely formed by the combination of the end cap major body 7 to shape the outside curved half-surface 38 of the turnaround passages 30 with the spacer part to shape the inside curved half-surface 52 of the turnaround passage 30. With the linear motion guide unit of the present invention, the slider 2 has a pair of sidewise opposing bulges in which there is provided the pair of circulating circuits 50, each of which is made up of the load-carrying race 20, the return passage 10, the longer turnaround passage 30 defined with the end cap major body 7 and the spacer part 8, and the shorter turnaround passage 30 defined between the spacer parts 8. The end cap 4 is kept in place relative to the carriage 3 and fastened to the carriage 3, with using threaded bolts 55 which are extended through holes 46 in the end cap 4 and tightened into the carriage 3. Upon precise location and connection of the end cap 4 to the carriage 3, abutment of the sleeve 6 against a spigot 48 of the end cap 4 keeps accurate location of the end cap 4 relative to the sleeve 6, making sure of precise alignment of the spigot 48 of the end cap 4 with the return passage 10 in the carriage 3. Thus, end-to-end abutment between the sleeve 6 and the spigot 48 of the end caps 4 comes into flush connection of the return passage 10 with the turnaround passage 30 to finish the circulating circuit 49 of rectangle in transverse section with causing no discontinuity or gap at the connection between them. Coplanar continuity with no gap between the turnaround passage 30 in the end cap 4 and the return passage 10 defined by the sleeve 6 inside fore-and-aft bore 9 in the carriage 3 helps the rollers 5 transfer smoothly from the turnaround passage 30 to the associated return passage 10 and also from the return passage 10 to the turnaround passage 30 in a circulating manner.

Figure 4:
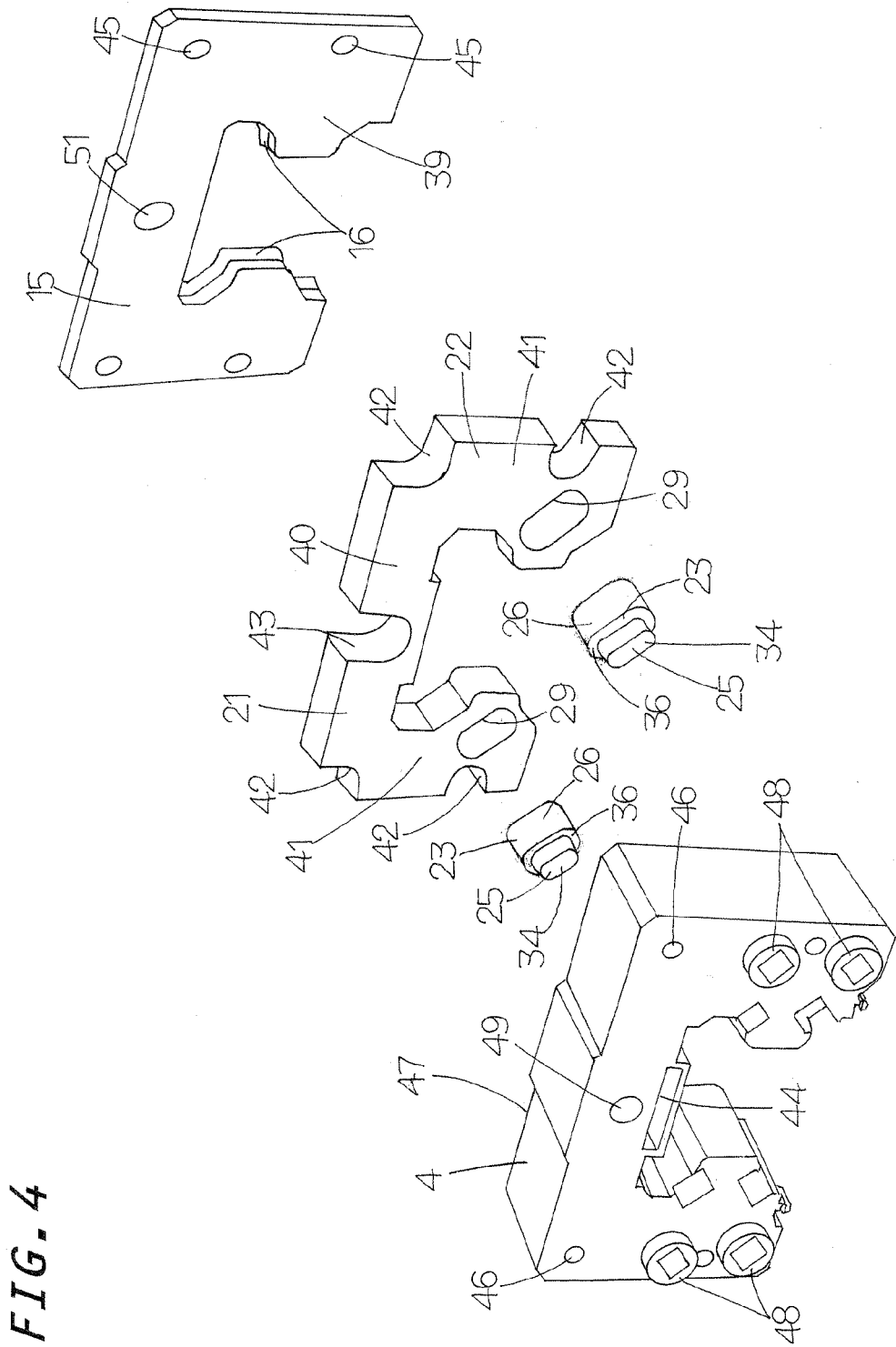
FIG. 4 is an exploded view in perspective showing an end cap, lubricant reservoir plate and an end seal in the linear motion guide unit of FIG. 1.

The lubricant reservoir plate 21, especially as shown in FIG. 4, is backed up with the end surface 39 of the end seal 15 between the end cap 4 and the end seal 15 to fit in the recess 31 on the end cap major body 7. More especially, the lubricant reservoir plate 21 is composed of a lubricant reservoir main body 22 which fits in a recess 31 formed in the end cap 4, and an applicator nose 23 which fits in an opening 29 made in the lubricant reservoir main body 22 and extends into a through-hole 33 to communicate with the slot 32 in the turnaround passage 30. The lubricant reservoir main body 22 is to store lubricant therein. With the linear motion guide unit of the present invention, moreover, the applicator nose 23 is disposed to engage with the rolling elements to apply directly lubricant around the rolling elements while they roll through the turnaround passage 30. The applicator nose 23 is composed of a basal part 26 and a nose part 25 raised above the basal part 26 to form a circular flat area 36 lying around the nose part 25. Thus, after the lubricant reservoir plate 21 has fit into the recess 31 in the end cap 4, the circular flat area 36 around the nose part 25 comes into abutment against a wall surface 37 of the recess 31 to keep in place the lubricant reservoir plate 21 and restrain the nose part 25 from protrusion into the turnaround passage. More especially, the through-hole 33 made in the outside circular surface 38 of the turnaround passage 30 in the end cap 4 has an elliptic shape elongated in a moving direction of the rollers 5. The nose part 25 of the applicator nose 23 is made in a solid extending from the flat area 36 to a tip face 34 to fit into the elliptic opening. Thus, the flat area 36 of the basal part 26 has the elliptic shape to circumferentially fit into the through-hole 33 in the end cap.

Figure 5:
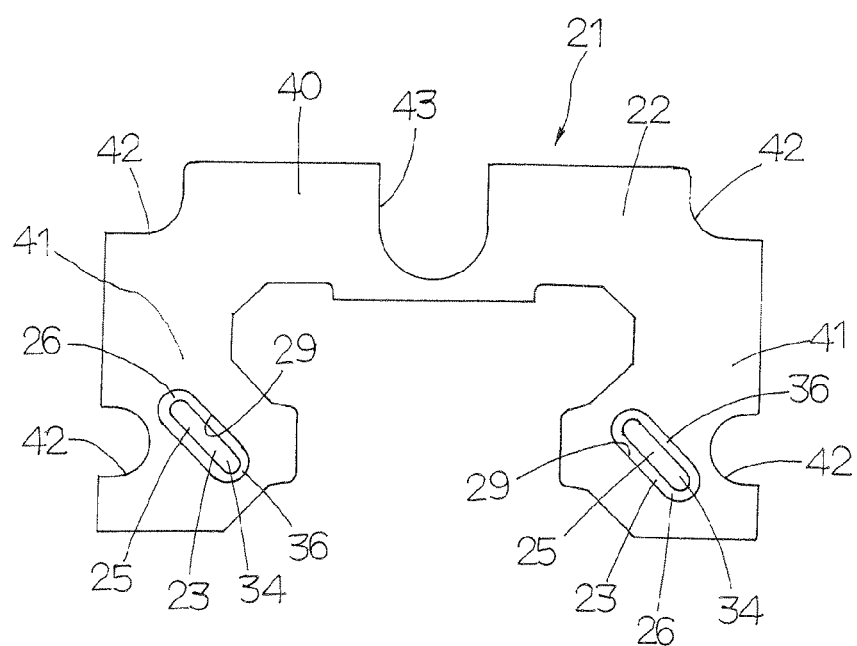
FIG. 5 is a view in front elevation of a version of the lubricant reservoir plate of FIG. 4.
Figure 6:
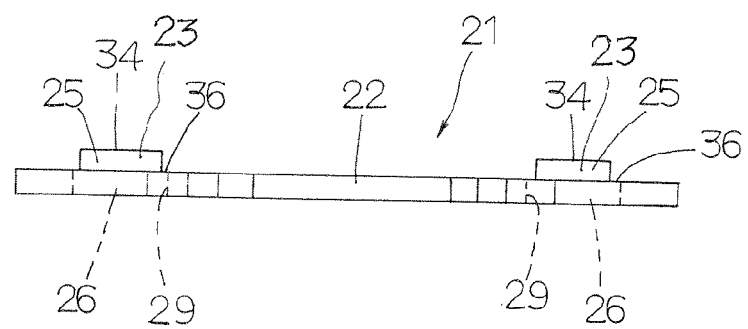
FIG. 6 is a view in bottom elevation of the lubricant reservoir plate of FIG. 5.
Figure 7:
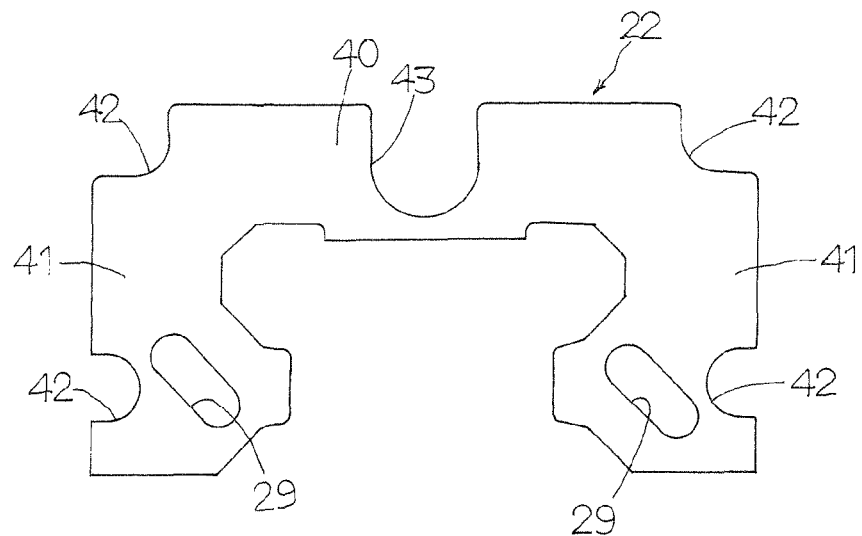
FIG. 7 is a view in front elevation to show a major body of lubricant reservoir plate of FIG. 5.
Figure 8:
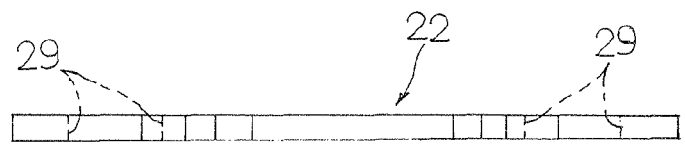
FIG. 8 is a view in bottom elevation showing the lubricant reservoir plate major body of FIG. 7.
Figure 9:
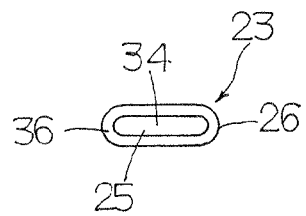
FIG. 9 is a view in front elevation showing an applicator nose for the lubricant reservoir plate of FIG. 5.
Figure 10:
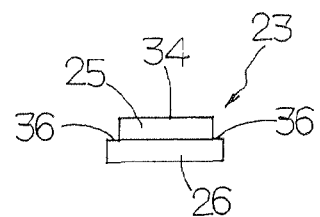
FIG. 10 is a view in bottom elevation of the applicator nose of FIG. 9.
Figure 11:
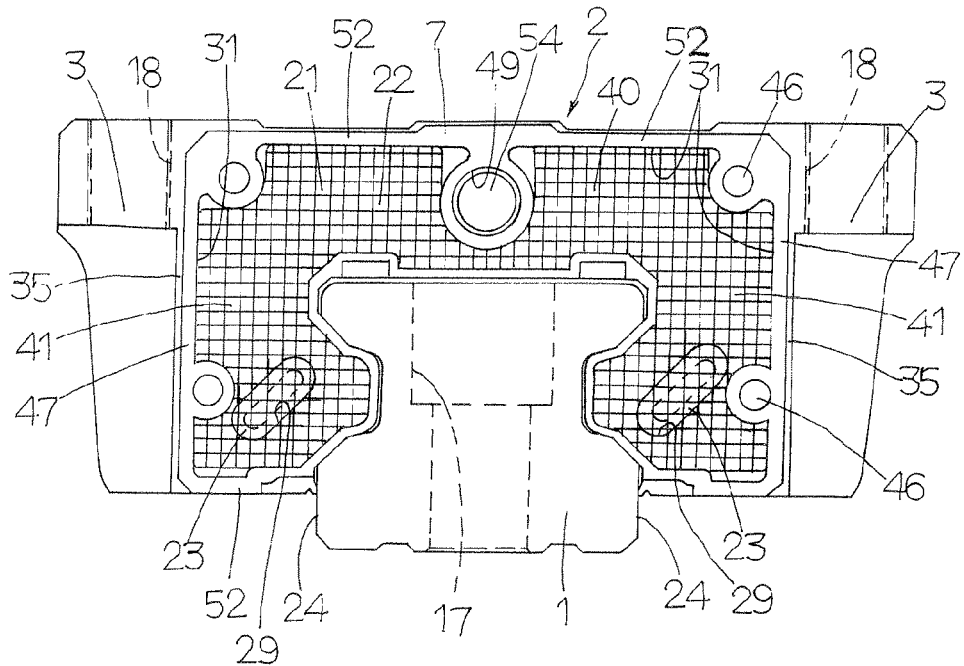
FIG. 11 is a view in front elevation showing the linear motion guide unit of the present invention, but in which the end seal is removed from the linear motion guide unit.
Figure 12:
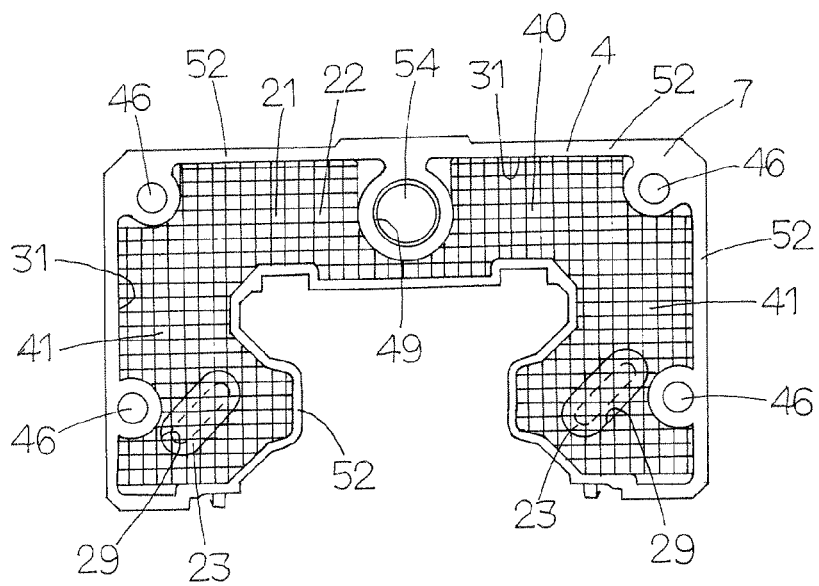
FIG. 12 is a view in front elevation of the end cap in which the lubricant reservoir plate is combined in preparation for assembly with linear motion guide unit shown in FIG. 11.
Figure 13:
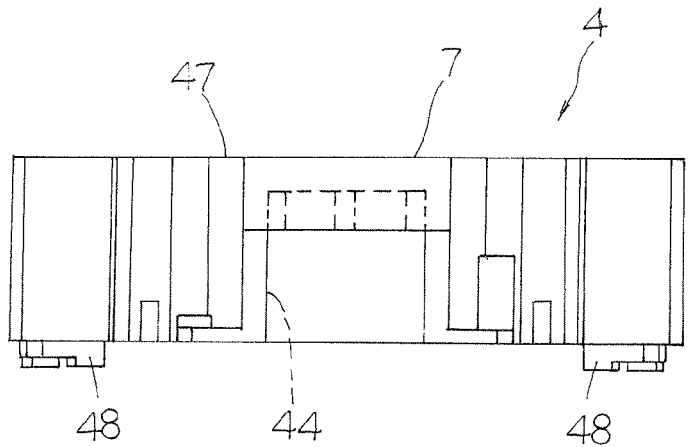
FIG. 13 is a view in bottom elevation showing the end cap for the linear motion guide unit of the present invention.

The applicator nose 23, as molded to be higher in density, is capable of regulating the amount of resupplied lubricant to the necessitated minimum. The lubricant reservoir main body 22, as especially shown FIG. 5, has an inverted U-shape including a main part 40 and bulges 41 extending from the opposite ends of the main part 40. The lubricant reservoir main body 22 at the widthwise center thereof is cut out as shown at 43 in alignment with the lubricant resupply port 54 of the end cap major part 7 and at widthwise opposite ends thereof is cut away at 42 to allow the fastening bolt 55 to extend across the lubricant reservoir main body 22. Moreover, the bulges 41 at the side edges thereof are cut away to make other hollows 42 which also allow the fastening bolt 55 to extend across the lubricant reservoir main body 22. The applicator nose 23 is constituted with the basal part 26 and the nose part 25. More especially, the basal part 26 has the flat area 36 which is larger in transverse section than the through-hole 33 in the end cap 4 to come into the end cap 4 around the through-hole 33, thereby keeping in place the applicator nose 23 relative to the end cap 4. The nose part 25 is integral with the basal part 26 and exposed at an end face 34 thereof to the slot 32 in the turnaround passage 30. The porous compact of the lubricant reservoir main body 22 has a molded density less in the porous compact of the applicator nose 23. With the linear motion guide unit constructed as stated earlier, thus, as the lubricant soaked in the applicator nose 23 is consumed, the lubricant previously held in the lubricant reservoir main body 22 may move to be resupplied into the applicator nose 23 with the capillary action.

The porous compact to provide the lubricant reservoir plate 21 is made of finely powdery ultrahigh molecular weight synthetic resin, which is first subjected to compacting and the resulting compact is subsequently sintered at elevated temperature. In the sintered compact, the fine particles of the powdery synthetic resin partially coalesce with each other with leaving intercommunicating voids to provide open-porous or open-cellular texture whose pores or cells preserved among fine particles are open each other through interstices or channels. The sintered resinous material of the lubricant reservoir main body 22 has a molded density less than 0.60 g/cm$^3$~0.70 g/cm$^3$ and the sintered resinous material of the applicator nose has a molded density in the range of from 0.60 g/cm$^3$ to 0.70 g/cm$^3$. Thus, as the porous compact of the lubricant reservoir main body 22 retains less lubricant than the porous compact of the applicator nose 23, lubricant can easily move from the lubricant reservoir main body 22 to the applicator nose 23 and no phenomenon would occur that the lubricant reservoir main body 22 soaks up lubricant from the applicator nose 23. As an alternative, the porous compact to provide the lubricant reservoir plate 21 may be made of, instead of the sintered resinous material as stated earlier, material for a wiper seal, which is disclosed in Japanese Laid-Open Patent Application No. 2009-144 746 which is a commonly-assigned senior application. The lubricant reservoir plate 21 may be made of polyester polyurethane foam of three-dimensional skeleton texture which is molded while compressed to ¼~1/20 under compression to provide open-porous or open-cellular texture. The nose part 25 of the applicator nose 25 has a higher density than in the lubricant reservoir plate 21, because of restricted or kept less partially or entirely in number and size of open-pores or open cells of the porous compact. That is, the nose part 25 of the applicator nose 25, while extending to the end face 34 to be exposed in part to the turnaround passage 30, is made entirely or at least in part higher in density than in the lubricant reservoir main body 22. More especially, less the molded density in the porous compact is, the greater the pore size and pore number in the porous compact are. As a result, the amount of lubricant absorbed and preserved in the porous compact, or impregnation rate, would increase. Generally, the porous compact under static or rest condition is in a state of retaining or preserving lubricant inside the open pores or cells. Once the porous compact comes into contact or engagement over the outward surface or skin thereof with the rolling elements such as the rollers 5 to experience any external force, the lubricant seeps out of the porous compact with using capillary action to apply the lubricant, for example, around the rolling elements 5. Thus, as the pore size and/or the number of pores in the porous compact increase, the lubricant squeezed out of the porous compact is larger in quantity than in the porous compact high in molded density. With the porous compact having high molded density, moreover, there is a greater likelihood that the volume of continuous pores or cells, or the open-pore size and the number of open pores inside the porous compact decreases and, therefore, the amount of lubricant absorbed and preserved in the porous compact, or the impregnation rate, declines with the result of a smaller amount of lubricant oozing out of the porous compact with capillary action, causing tougher application of lubricant around the rolling elements.

Figure 18:
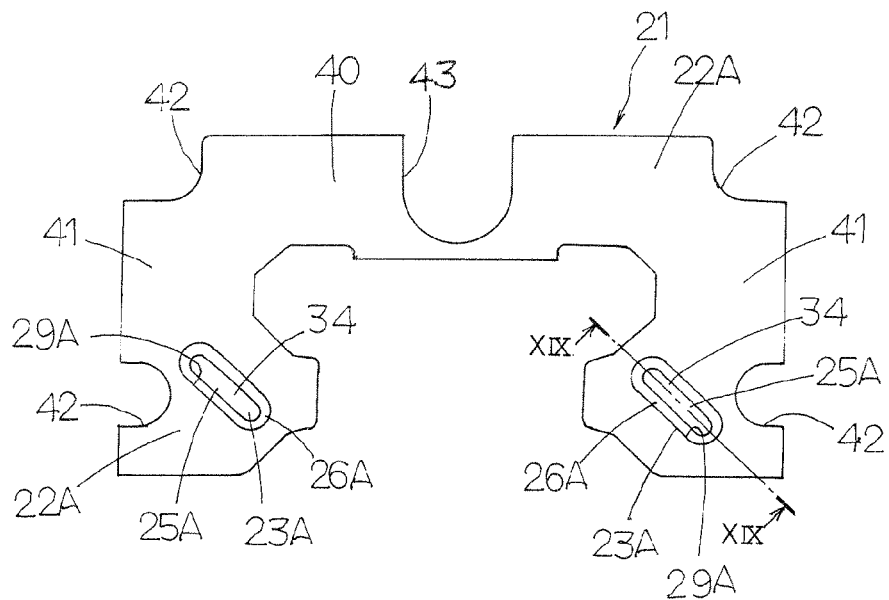
FIG. 18 is a view in front elevation showing another version of the lubricant reservoir plate in the linear motion guide unit of the present invention.
Figure 19:
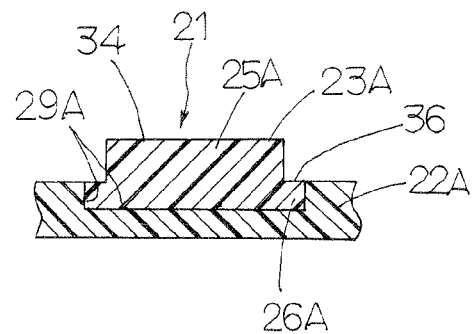
Figure 20:
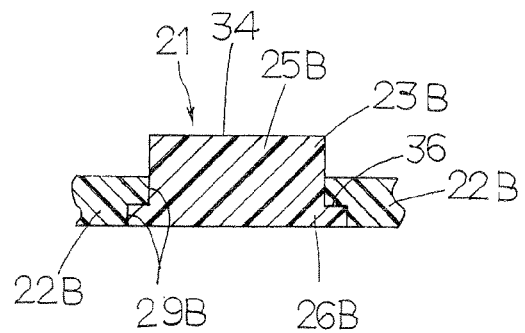
FIG. 20 is a view in section showing a further another version of the lubricant reservoir plate in an area corresponding to the view taken along the plane of line XIX-XIX of FIG. 18.

Referring to FIGS. 18 and 19, there is shown another version of the linear motion guide unit of the present invention. A lubricant reservoir main body 22 in the lubricant reservoir plate 21 has a bottomless hole 29A to fit over an applicator nose 23A. With the applicator nose 23A, a nose part 25A is integral with a basal part 26A having the circular flat area 36. The applicator nose 23A is the same in function as the applicator nose 23 previously described, so that the previous description will be applicable. In FIG. 20, moreover, there is shown a further another version of the lubricant reservoir plate 21. With the lubricant reservoir plate 21 in this version, the lubricant reservoir plate 21 has a stepwise hole 29B to fit over an applicator nose 23B, which has a nose part 25B and a basal part 26B having the circular flat area 36. The applicator nose 23B is kept in place relative to the end cap major part 7 after the circular flat area 36 of the basal part 26B has snugly fit in the stepwise hole 29B. The applicator nose 23B is the same in function as the applicator nose 23 previously described, so that the previous description will be applicable. With the linear motion guide unit of the present invention, the porous compact to provide the lubricant reservoir plate 21, instead of the sintered resinous resins and the polyester polyurethane foam recited earlier, may be made of fibrous material such as nonwoven cloth, felt, cotton.

What is claimed is:

1. A linear motion guide unit; comprising an elongated guide rail having widthwise opposed sides each of which has first raceway surfaces extending lengthwise of the guide rail, a slider having second raceway surfaces extending in opposition to the first raceway surfaces on the guide rail to define load-carrying races between the first raceway surfaces and the second raceway surfaces, and more than one rolling element rolling through the load-carrying races to move the slider relative to the guide rail;

wherein the slider includes a carriage, end caps, a-lubricant reservoir plates of porous compact, and end seals, the carriage having the second raceway surfaces and return passages extending in parallel with the second raceway surfaces, the end caps being fastened on forward and aft end surfaces of the carriage, one to each end surface, and provided with turnaround passages to join together the load-carrying race and the return passages, the lubricant reservoir plates being impregnated with lubricant and installed in the end caps to cause the lubricant to be applied around the rolling elements while rolling through the turnaround passages, and the end seals being installed on the end caps;

wherein each of the lubricant reservoir plates is composed of a lubricant reservoir main body installed between each of the end caps and each of the end seals to fit in a recess formed in each of the end caps, and an applicator nose which fits in a through-hole made in the lubricant reservoir main body and extends to communicate with slots in the respective turnaround passages;

wherein the applicator nose is constituted with a basal part and a nose part raised above the basal part to form a surface of circular shape lying around the nose part, the circular shape being larger in transverse section than the through-hole to come into abutment around the nose part against the end cap to keep in place the applicator nose, and the nose part being integral with the basal part to fit into the opening in the lubricant reservoir main body to expose an end face of the nose part to the turnaround passage; and wherein a molded density of the porous compact is less in the lubricant reservoir main body than in the applicator nose whereby as the lubricant soaked in the applicator nose is consumed, the lubricant previously held in the lubricant reservoir main body moves to be resupplied into the applicator nose with capillary action.

2. The linear motion guide unit constructed as defined in claim 1, wherein the porous compact to provide the lubricant reservoir plate is made of a powdery ultrahigh molecular weight synthetic resin, which is first subjected to compacting and the resulting compact is subsequently sintered at a temperature sufficient to provide open-porous or open-cellular texture whose pores or cells preserved among fine particles are intercommunicated through interstices or channels, and wherein the lubricant reservoir main body has a molded density less than $0.60 \text{ g/cm}^3$ and the applicator nose has a molded density in the range of from $0.60 \text{ g/cm}^3$ to $0.70 \text{ g/cm}^3$.

3. The linear motion guide unit constructed as defined in claim 1, wherein the porous compact is made of polyester polyurethane foam of three-dimensional skeleton texture which is molded while compressed to $1/4$ to $1/20$ under compression to provide open-porous or open-cellular texture.

4. The linear motion guide unit constructed as defined in claim 1, wherein the porous compact is made of fibrous material selected from nonwoven cloth, felt and cotton.

5. The linear motion guide unit constructed as defined in claim 1, wherein a circular area after the lubricant reservoir plate has fit into the recess in the end cap comes into abutment around the nose part against a wall surface around the recess in the end cap keeps the nose part against protrusion into the turnaround passage.

6. The linear motion guide unit constructed as defined in claim 1, wherein a circular area after the lubricant reservoir plate has fit into the recess in the end cap comes into abutment around the nose part against a stepwise wall in the through-hole in the turnaround passage to keep the nose part against protrusion into the turnaround passage.

7. The linear motion guide unit constructed as defined in claim 1, wherein the slot open to an outside circular surface of the turnaround passage in the end cap has an figure elongated in a moving direction of the rollers and wherein the nose part of the applicator nose is made in a solid extending from the circular shape to a tip face to fit into the slot.

* * * * *